United States Patent [19]

Rott

[11] Patent Number: 5,050,110
[45] Date of Patent: Sep. 17, 1991

[54] PROCESS AND MECHANISM FOR DETERMINING THE EFFECTIVE AIR TEMPERATURE IN AT LEAST ONE PNEUMATIC TIRE OF A VEHICLE

[75] Inventor: Erich Rott, Augsburg, Fed. Rep. of Germany

[73] Assignee: Bayerische Motoren Werke AG, Fed. Rep. of Germany

[21] Appl. No.: 448,994

[22] Filed: Dec. 12, 1989

[30] Foreign Application Priority Data

Dec. 19, 1988 [DE] Fed. Rep. of Germany ....... 3842723

[51] Int. Cl.$^5$ ............................................. B60C 23/20
[52] U.S. Cl. .................................. 364/557; 73/146.2; 116/34 R
[58] Field of Search ...................... 73/146.2; 116/34 R; 364/557

[56] References Cited

U.S. PATENT DOCUMENTS

| | | | |
|---|---|---|---|
| 3,602,884 | 8/1971 | Brumbelow | 340/448 |
| 4,574,267 | 3/1986 | Jones | 73/146.2 X |
| 4,673,298 | 6/1987 | Hunter et al. | 374/131 X |
| 4,760,371 | 7/1988 | Don | 116/34 R X |

FOREIGN PATENT DOCUMENTS

| | | |
|---|---|---|
| 0045401 | 2/1986 | European Pat. Off. . |
| 0187694 | 7/1986 | European Pat. Off. . |
| 2206517 | 8/1973 | Fed. Rep. of Germany . |
| 2314613 | 10/1973 | Fed. Rep. of Germany . |
| 3445854 | 6/1986 | Fed. Rep. of Germany . |
| 3605097 | 8/1986 | Fed. Rep. of Germany . |
| 3539489 | 5/1987 | Fed. Rep. of Germany . |
| 2052121 | 1/1981 | United Kingdom . |
| 2171525 | 8/1986 | United Kingdom . |

Primary Examiner—Parshotam S. Lall
Assistant Examiner—Edward R. Casimano
Attorney, Agent, or Firm—Evenson, Wands, Edwards, Lenahan & McKeown

[57] ABSTRACT

A process for determining the effective air temperature in at least one pneumatic tire of a vehicle sensor. In addition to the temperature in proximity of the interior side of the rim of the respective vehicle wheel, the temperature in the immediate environment of a vehicle brake disk or brake drum as well as the temperature in the immediate environment of the vehicle is sensed. From these measured temperature values, the effective air temperature in the respective pneumatic vehicle tire is then calculated. A mechanism for carrying out the process is disclosed. A formula for combining the sensor temperatures is disclosed. Lastly specific locations for the sensors are disclosed.

19 Claims, 1 Drawing Sheet

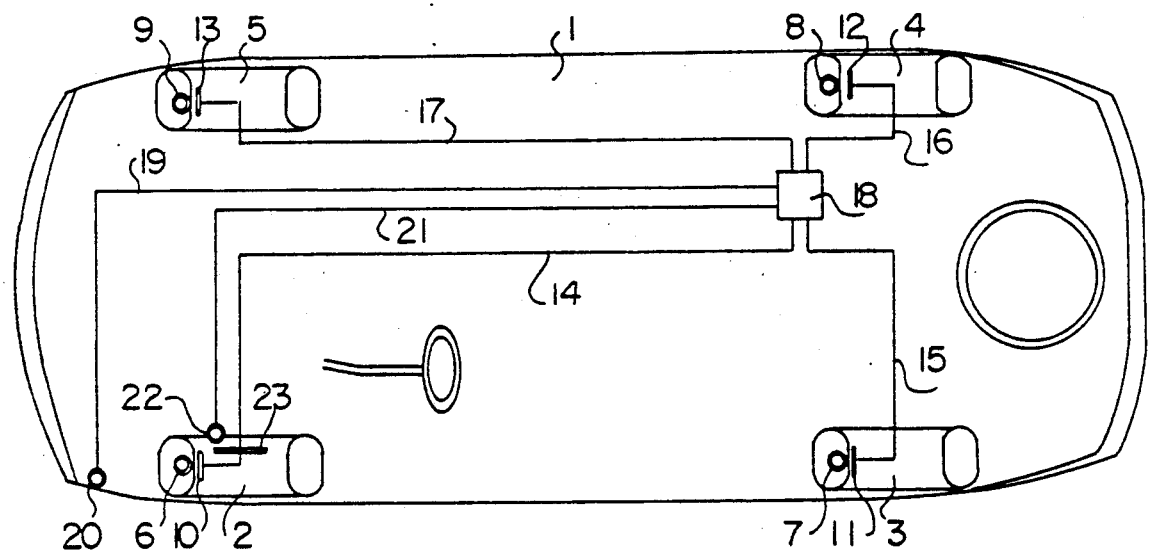

PROCESS AND MECHANISM FOR DETERMINING THE EFFECTIVE AIR TEMPERATURE IN AT LEAST ONE PNEUMATIC TIRE OF A VEHICLE

BACKGROUND AND SUMMARY OF THE INVENTION

The invention relates to a process and mechanism for determining the effective air temperature in at least one pneumatic tire of a vehicle by a mechanism which measures the temperature in proximity of the interior side of the rim of the respective vehicle wheel.

A process and mechanism for this type of temperature sensing are known in vehicle tire air pressure monitoring devices or vehicle tire air pressure control devices.

For example, DE-OS 35 39 489 shows a process for the monitoring of the vehicle tire air pressure, wherein the determined tire air pressure value of one of the pneumatic vehicle tires is compared with desired tire air pressure value which is a function of the air temperature in the respective pneumatic tire of the vehicle.

In all previously known vehicle tire air pressure monitoring devices and vehicle tire air pressure control devices utilizing air temperature, the temperature is measured in proximity of the interior side of the rim of the respective vehicle wheel by means of a temperature sensor arranged thereat. However, this method of determining the tire air pressure is very inexact, since the temperature measured by means of the temperature sensor arranged at the interior side of the rim of the respective vehicle wheel is falsified by the heat transmission from the exterior side of the rim to the interior side of the rim of the respective vehicle wheel. This heat transmission is a function of the temperature at the exterior side of the rim of the respective vehicle wheel which, in turn, is determined by the respective outside temperature; (the respective ambient temperature of the vehicle) and by the braking heat radiated by the pertaining vehicle brake disk or vehicle brake drum.

It is therefore an object of the invention to provide a process as well as a mechanism for determining the effective air temperature in at least one of the pneumatic tires of a vehicle to avoid the above inexact temperature sensing.

According to the invention, this object is achieved in that, in addition to the temperature in proximity of the interior side of the rim of the respective vehicle wheel, the temperature in the immediate environment of a vehicle brake disk or vehicle brake drum, as well as the temperature in the immediate environment of the vehicle are measured. The effective air temperature in the respective pneumatic vehicle tire is calculated from these measured values of the temperature in the proximity of the interior side of the rim, for the temperature in the immediate environment of a vehicle brake disk or vehicle brake drum, and of the temperature in the direct environment of the vehicle.

The value of the effective air temperature in the pneumatic vehicle tire (determined in this manner) is independent of the outside temperature and thus of the temperature in the immediate environment of the vehicle and is also independent of the heat quantity which is radiated by the vehicle brake disk or vehicle brake drum assigned to the respective vehicle wheel. Thus the temperature measured by the temperature sensor arranged at the interior side of the rim which is compensated by the outside temperature and the heat radiation of the Pertaining vehicle brake disk or vehicle brake drum is a more exact temperature.

Preferably, the effective air temperature in the pneumatic vehicle tire is determined according to the following mathematical formula:

$$T_{RLeff} = T_I - f_1(T_{UB}) + f_2(T_{UF})$$

wherein
- $T_{RLeff}$ = effective air temperature in the pneumatic vehicle tire
- $T_I$ = temperature in proximity of the interior side of the rim of the respective vehicle wheel
- $f_1$ = first mathematical function of the temperature in the immediate environment of a vehicle brake disk or vehicle brake drum
- $T_{UB}$ = temperature in the immediate environment of a vehicle brake disk or vehicle brake drum
- $f_2$ = second mathematical function of the temperature in the immediate environment of the vehicle
- $T_{UF}$ = temperature in the immediate environment of the vehicle A device for carrying out the above-described process, includes a first temperature sensor arranged at the interior side of the rim of the respective vehicle wheel, a second temperature sensor in the immediate environment of a vehicle brake disk or vehicle brake drum, a third temperature sensor for detecting the ambient temperature of the vehicle and a computing unit for calculating the effective air temperature in the respective pneumatic vehicle tire in accordance with the above formula and outputs from the aforementioned three temperature sensors.

The three temperature sensors are preferably constructed as analog sensors.

According to a further development of the invention, the thermal time constants and the error tolerances of the three temperature sensors are at least almost identical. In the case of temperature sensors that are selected in this manner, the calculation of the effective air temperature in the pneumatic vehicle tire can take place in a very simple manner.

According to a further development of the invention, the second temperature sensor and the third temperature sensor are arranged on the same vehicle side.

The second temperature sensor is preferably arranged in the wheel housing of a vehicle front wheel. In the case of this arrangement of the second temperature sensor, the temperature in the immediate environment of a vehicle brake disk or vehicle brake drum can be detected very well.

The second temperature sensor is preferably arranged at the vehicle such that the temperature proportion of the temperature in proximity of the interior side of the rim of the respective vehicle wheel, which is a result of the heat radiation of the vehicle brake disk or vehicle brake drum, is completely compensated by the value of the difference of the temperature in the immediate environment of the vehicle brake disk or vehicle brake drum, minus the temperature in the immediate environment of the vehicle. In the case of this type of an arrangement of the second temperature sensor at the vehicle, the effective air temperature of a pneumatic vehicle tire can be determined by the subtraction of the temperature in the immediate environment of a vehicle brake disk (or vehicle brake drum) from the addition of the temperature in the immediate environment of the vehicle and the value to the temperature in proximity of the interior side of the rim of the respective vehicle wheel.

It has also been proven to be advantageous for the third temperature sensor to be arranged in one of the front or the rear lateral bumper parts. This arrangement ensures that the third temperature sensor is protected from rain and dirty water, direct sun radiation as well as the heat radiation of the internal-combustion engine of the vehicle. Additionally, the sensor is accessible to the air stream.

The above-described process as well as the above-described device are preferably used for a vehicle tire air pressure monitoring devices or for a vehicle tire air pressure control devices.

Other objects, advantages and novel features of the present invention will become apparent from the following detailed description of the invention when considered in conjunction with the accompanying drawings.

BRIEF DESCRIPTION OF THE DRAWING

The single Figure is a top view of the contours of a motor vehicle which is equipped with a device according to the invention.

DETAILED DESCRIPTION OF THE DRAWING

The motor vehicle (shown schematically in the Figure), is provided with one temperature sensor 6, 7, 8, 9 at the interior side of the rim of each of four vehicle wheels 2, 3, 4, 5. These temperature sensors 6, 7, 8, 9, measure the temperature in the respective pneumatic tires in proximity of the respective interior side of the rim. The measured temperature values are transmitted from the vehicle wheel 2, 3, 4, 5 to a Part 10, 11, 12, 13 of a respective transmitter arrangement fixed on the vehicle and from there they are transmitted to a computing unit 18 by a respective connecting line 14, 15, 16, 17. This computing unit 18 is connected with a temperature sensor 20 for detecting the ambient temperature of the vehicle 1 by connecting line 19. Finally, the computing unit 18 is also connected with a temperature sensor 22 arranged in the wheel housing of the left vehicle front wheel 2 by connecting line 21. Heat radiated by the brake disk 23 of the wheel 2 is detected by this temperature sensor 22. From the values of the temperature in Proximity of the interior side of the rim of the individual vehicle wheels 2, 3, 4, 5; the value for the ambient temperature; and the value of the temperature in the immediate environment of at least one vehicle brake disk 23, the value of the effective air temperature in the individual pneumatic tires of the vehicle wheels 2, 3, 4 5 is than calculated with very high precision in the computing unit 18.

If only the heat radiated by one of the two brake disks (the heated radiated by brake disk 23 as shown) is sensed by a single temperature sensor, (temperature sensor 22), the respective heat radiation of the other brake disks or brake drums of the motor vehicle 1 can be calculated by the computing unit 18 as a function of the heat radiation of the brake disk 23 sensed by the temperature sensor 22. The functional relationship between the heat radiation sensed by temperature sensor 22 and the respective heat radiation by the other brake disks or brake drums stored in the computing unit 18 may be determined by means of braking tests or on the basis of known brake force distribution.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A device for determining the effective air temperature in at least one pneumatic tire of a vehicle wheel comprising:
    a first temperature sensor means arranged at an interior side of a rim of the respective vehicle wheel for measuring the temperature at an interior side of the rim;
    a second temperature sensor means in the immediate environment of a vehicle brake for measuring the temperature in the immediate environment of the vehicle brake;
    a third temperature sensor means for measuring the ambient temperature of the vehicle; and
    a computing unit connected to said three temperature sensor means for computing the effective air temperature in the respective pneumatic vehicle tire from the three measured temperatures.

2. A device according to claim 1, wherein the second temperature sensor means and the third temperature sensor means are both located on a same side of the vehicle.

3. A device according to claim 1, wherein the second temperature sensor is located in a wheel housing of a vehicle front wheel.

4. A device according to claim 1, wherein the third temperature sensor is arranged in a bumper part of the vehicle.

5. A device according to claim 1, wherein the third temperature sensor is protected from rain, splashing water and heat radiation of the internal-combustion engine of the vehicle and is accessible to an air stream about the vehicle.

6. A device according to claim 1, wherein the computing unit computes the effect of air temperature in the respective pneumatic vehicle tire according to the mathematical formula:

$$T_{RLeff} = T_I - f_1(T_{UB}) + f_2(T_{UF})$$

wherein
   $T_{RLeff}$ = effective air temperature in the pneumatic vehicle tire
   $T_I$ = temperature in proximity of the interior side of the rim of the respective vehicle wheel
   $f_1$ = first mathematical function of the temperature in the immediate environment of a vehicle brake disk or vehicle brake drum
   $T_{UB}$ = temperature in the immediate environment of a vehicle brake disk or vehicle brake drum
   $f_2$ = second mathematical function of the temperature in the immediate environment of the vehicle
   $T_{UF}$ = temperature in the immediate environment of the vehicle.

7. A device according to claim 1, wherein the second temperature sensor is located at the vehicle such that a temperature proportion of the temperature in proximity of the interior side of the rim of the respective vehicle wheel which occurs as a result of heat radiation from the vehicle brake is completely compensated for by a value equal to the difference of the temperature in the immediate environment of the vehicle brake minus the temperature in the immediate environment of the vehicle.

8. A device according to claim 7, wherein the third temperature sensor is protected from rain, splashing water and heat radiation of the internal-combustion engine of the vehicle and is accessible to an air stream about the vehicle.

9. A device according to claim 1, wherein the three temperature sensor means each emit an analog output signal.

10. A device according to claim 9, wherein the second temperature sensor means and the third temperature sensor means are both located on a same side of the vehicle.

11. A device according to claim 9, wherein the second temperature sensor is located at the vehicle such that a temperature proportion of the temperature in proximity of the interior side of the rim of the respective vehicle wheel which occurs as a result of heat radiation from the vehicle brake is completely compensated for by a value equal to the difference of the temperature in the immediate environment of the vehicle brake minus the temperature in the immediate environment of the vehicle.

12. A device according to claim 9, wherein the three temperature sensor means are identical with respect to their thermal time constants and error tolerances.

13. A device according to claim 12, wherein the second temperature sensor means and the third temperature sensor means are both located on a same side of the vehicle.

14. A device according to claim 1, wherein the three temperature sensor means are identical with respect to their thermal time constants and error tolerances.

15. A device according to claim 14, wherein the second temperature sensor means and the third temperature sensor means are both located on a same side of the vehicle.

16. A device according to claim 14, wherein the second temperature sensor is located in a wheel housing of a vehicle front wheel.

17. A device according to claim 14, wherein the second temperature sensor is located at the vehicle such that a temperature proportion of the temperature in proximity of the interior side of the rim of the respective vehicle wheel which occurs as a result of heat radiation from the vehicle brake is completely compensated for by a value equal to the difference of the temperature in the immediate environment of the vehicle brake minus the temperature in the immediate environment of the vehicle.

18. A device according to claim 14, wherein the third temperature sensor is arranged in a bumper part of the vehicle.

19. A device according to claim 14, wherein the third temperature sensor is protected from rain, splashing water and heat radiation of the internal-combustion engine of the vehicle and is accessible to an air stream about the vehicle.

* * * * *